(12) United States Patent
Zhang et al.

(10) Patent No.: US 8,326,856 B2
(45) Date of Patent: Dec. 4, 2012

(54) METHOD AND APPARATUS OF AUTOMATIC METHOD SIGNATURE ADAPTATION FOR DYNAMIC WEB SERVICE INVOCATION

(75) Inventors: Liang-Jie Zhang, Cortlandt Manor, NY (US); Tian-Jy Chao, Bedford, NY (US); Hung-Yang Chang, Scarsdale, NY (US)

(73) Assignee: International Business Machines Corporation, Armonk, NY (US)

( * ) Notice: Subject to any disclaimer, the term of this patent is extended or adjusted under 35 U.S.C. 154(b) by 1253 days.

(21) Appl. No.: 12/033,275

(22) Filed: Feb. 19, 2008

(65) Prior Publication Data

US 2008/0228742 A1 Sep. 18, 2008

Related U.S. Application Data

(62) Division of application No. 10/145,118, filed on May 15, 2002, now abandoned.

(51) Int. Cl.
*G06F 17/30* (2006.01)
(52) U.S. Cl. ......... 707/760; 707/761; 707/763; 707/809
(58) Field of Classification Search .................. 707/707, 707/708, 710, 760, 761, 763, 809
See application file for complete search history.

(56) References Cited

U.S. PATENT DOCUMENTS

| | | | |
|---|---|---|---|
| 6,505,219 B1 | 1/2003 | MacLean et al. | |
| 6,691,163 B1 | 2/2004 | Tufts | |
| 6,792,605 B1* | 9/2004 | Roberts et al. | 719/313 |
| 6,799,174 B2 | 9/2004 | Chipman et al. | |
| 7,127,700 B2* | 10/2006 | Large | 717/100 |
| 7,386,860 B2* | 6/2008 | Dani et al. | 719/315 |
| 7,493,397 B1* | 2/2009 | Guthrie et al. | 709/227 |
| 7,496,637 B2* | 2/2009 | Han et al. | 709/217 |
| 7,568,205 B2* | 7/2009 | Guthrie et al. | 719/330 |
| 7,644,414 B2* | 1/2010 | Smith et al. | 719/328 |
| 7,769,825 B2* | 8/2010 | Karakashian et al. | 709/219 |
| 7,783,717 B1* | 8/2010 | Savchenko et al. | 709/217 |
| 7,822,826 B1* | 10/2010 | Savchenko et al. | 709/217 |
| 7,983,209 B2* | 7/2011 | Goring et al. | 370/324 |
| 2001/0011241 A1* | 8/2001 | Nemzow | 705/35 |
| 2002/0120704 A1 | 8/2002 | Karp et al. | |
| 2002/0147745 A1* | 10/2002 | Houben et al. | 707/513 |
| 2003/0023957 A1* | 1/2003 | Bau et al. | 717/140 |
| 2003/0093436 A1* | 5/2003 | Brown et al. | 707/103 Z |
| 2003/0093468 A1* | 5/2003 | Gordon et al. | 709/203 |
| 2003/0105846 A1* | 6/2003 | Zhao et al. | 709/221 |
| 2003/0110242 A1* | 6/2003 | Brown et al. | 709/222 |
| 2003/0110373 A1 | 6/2003 | Champion | |
| 2003/0126136 A1* | 7/2003 | Omoigui | 707/10 |
| 2003/0163450 A1* | 8/2003 | Borenstein et al. | 707/1 |

(Continued)

*Primary Examiner* — Thanh-Ha Dang
(74) *Attorney, Agent, or Firm* — Daniel P. Morris; McGinn IP Law Group, PLLC (57) ABSTRACT

A method (and apparatus) for adapting an input parameter, for dynamically invoking target Web services, and for adapting output results, includes receiving an invocation request including an input parameter in a first format. A semantic information representation module MetaWSDL (Meta Web Service Description Language), wherein the MetaWSDL includes a universal XML (eXtended Markup Language) representation which includes semantic information of a Web service method signature, is retrieved from a memory. A MetaWSDL processor is invoked to adapt the input parameter to a second format using the retrieved MetaWSDL. The target Web services are dynamically invoked, using the adapted parameter in the second format, and the output result in the first format is adapted to the second format, using the MetaWSDL.

18 Claims, 3 Drawing Sheets

U.S. PATENT DOCUMENTS

| | | |
|---|---|---|
| 2003/0163513 A1* | 8/2003 | Schaeck et al. ............... 709/201 |
| 2003/0177282 A1 | 9/2003 | Hejlsberg et al. |
| 2003/0182364 A1* | 9/2003 | Large et al. ................... 709/203 |
| 2003/0182624 A1* | 9/2003 | Large ............................ 715/513 |
| 2003/0191802 A1* | 10/2003 | Zhao et al. .................... 709/203 |
| 2003/0204467 A1 | 10/2003 | Kartha et al. |
| 2003/0204612 A1 | 10/2003 | Warren |
| 2003/0204645 A1* | 10/2003 | Sharma et al. ................ 709/328 |
| 2003/0212527 A1* | 11/2003 | Moore et al. ................. 702/179 |
| 2003/0220925 A1 | 11/2003 | Lior |
| 2004/0006653 A1 | 1/2004 | Kamen et al. |
| 2004/0015564 A1* | 1/2004 | Williams ...................... 709/219 |
| 2004/0054690 A1* | 3/2004 | Hillerbrand et al. ....... 707/104.1 |
| 2004/0064554 A1 | 4/2004 | Kuno et al. |
| 2004/0128345 A1 | 7/2004 | Robinson et al. |
| 2004/0199636 A1* | 10/2004 | Brown et al. ................. 709/227 |
| 2004/0210602 A1 | 10/2004 | Hillis et al. |
| 2004/0213409 A1* | 10/2004 | Murto et al. .................. 380/258 |
| 2005/0027495 A1* | 2/2005 | Matichuk .......................... 703/2 |
| 2005/0071448 A1* | 3/2005 | Katz et al. ..................... 709/223 |
| 2005/0086197 A1 | 4/2005 | Boubez et al. |
| 2005/0183002 A1* | 8/2005 | Chapus ......................... 715/505 |
| 2005/0193097 A1* | 9/2005 | Guthrie et al. ................ 709/219 |
| 2006/0004764 A1 | 1/2006 | Kurhekar et al. |
| 2006/0047665 A1* | 3/2006 | Neil ................................. 707/10 |
| 2006/0136309 A1* | 6/2006 | Horn et al. ...................... 705/26 |

* cited by examiner

METHOD AND APPARATUS OF AUTOMATIC METHOD SIGNATURE ADAPTATION FOR DYNAMIC WEB SERVICE INVOCATION

This Application is a Divisional Application of U.S. patent application Ser. No. 10/145,118, filed on May 15, 2002, now abandoned.

BACKGROUND OF THE INVENTION

1. Field of the Invention

The present invention generally relates to a dynamic e-business applications. More particularly, this invention relates to a method and apparatus of automatic method signature adaptation for dynamic Web service invocation.

2. Description of the Related Art

Dynamic e-business is the dynamic adaptation of e-business processes and associated systems to support changing business strategies and tactics. It enables enterprise software to be modeled to fit the required business processes, rather than the other way around. When companies in an industry use the same enterprise software and adapt their business processes to fit it, they inevitably conduct their business in the same way as their competitors. Flexibility in infrastructure design allows new processes to be tried and deployed to develop a competitive advantage by doing it differently than the competition. Dynamic e-business offers the same flexibility in business partner integration. Web services technologies enable dynamic e-business. The use of Web services as programmable objects with real-world actions is fundamental to dynamic e-business. By exposing business functions as Web services that can be accessible anywhere over the Internet, a company becomes integration-ready to jump on any emerging opportunity with a business partner, such as to merge business processes in a merger or acquisition.

Web service represents a revolution in e-business capabilities; it enables a dynamic e-business model, fosters collaboration with layered services, and opens the doors for new business opportunities. Web Service is defined by new technologies like Simple Object Access Protocol (SOAP), Web Services Definition Language (WSDL), Web Service Inspection (WS-Inspection) Language (WSIL), and Universal Description, Discovery, and Integration (UDDI). These technologies include a model for exchanging XML information, a language for describing services, and a directory for finding new business partners, respectively. Together, they enable Web services, a powerful new paradigm for creating e-business applications by integrating reusable software modules supported on the Web.

SOAP defines a model for using simple request and response messages written in XML as the basic protocol for electronic communication. SOAP can be used with any transport protocol; HTTP is currently popular. SOAP messaging is often modeled as a platform-neutral remote procedure call (RPC) mechanism, but it can be used for the exchange of any kind of XML information. Creating clients to access the SOAP services published in UDDI, is a straightforward process if the developer knows the exact interface of a Web Service. Interacting with a "document-oriented" SOAP service requires the use of lower-level SOAP API calls. Envelope object containing header and body to be sent must first be created. Another widely used way is interacting with SOAP RPC service.

The steps for creating a client that interacts with SOAP RPC services are:

1. Obtain the interface description of the SOAP service and create a call object. This provides one with the signatures of the methods that one wishes to invoke. Also one can look at a WSDL for the services. The SOAP Call object is the main interface to the underlying SOAP RPC code.

2. Set the target URI and Set the method name that one wish to invoke in the call object and Pass in the URN that the service uses as its identifier in its deployment descriptor.

3. Create the necessary Parameter objects for the RPC call and set them in the Call object using setParams( ). Ensure one have the same number of parameters of the same types as required by the service.

4. Execute the Call object's invoke method, retrieve the Response object and then extract any result or returned parameters.

In the dynamic e-business area, it is very hard to match the input parameters and output result format in advance for the Web services Invoke in the e-business application. Customers, marketplaces, and search engines can find the company to do business. Upon finding a suitable service provider, the company binds to the provider to begin e-business transactions. To access a Web service, software only gets the WSDL description of interface information. WSDL can be provided to a potential user of a Web service for rapid integration by way of a Web link to the file, an e-mail attachment, or from the UDDI Registry directly. Any companies can publish their own Web Services to any categories in multiple UDDI registries. So the Web Services they published will have different service interfaces which contain different method signatures. The inventors refer to these Web Services as "heterogeneous Web Services."

At the present time, even within a specific industry domain, there are no industrial standards, nor are there unified service definitions. Furthermore, neither the service definitions to be unified nor standardized are in the near foreseen future. Therefore, heterogeneous Web Services are going to be a fact of life for a while, which poses problems for dynamic e-business integration. This is because there is always a need for human intervention to read the WSDL for Web Services and then to correctly construct input parameters so that they match properly with the WSDL definitions. Such manual processes take time and cause errors.

The need for a manual process to construct and match input parameters for Web Services is a result of the limited information defined in current WSDL for Web Services interfaces, i.e. only the method name and type of parameters, which is too generic, as well as, limited to be adequate for a program to automatically invoke the target Web Service. The current WSDL does not describe semantic information as to how to construct each input parameter, i.e. what kind the parameter is representing. For example, a WSDL defines an input parameter to be a number (i.e. float type), which can be interpreted for anything. Is the number representing a measurement, e.g. kg, pound, foot, oz, or a temperature; or is it presenting the amount of money, which can be in US dollars or in UK pounds? Unless the desired semantic definitions are clearly specified, it would not be possible for programs to correctly construct the input parameters for automatic invocation. Similarly, problems exist for the need to adapt output results to the correct format and units. Hence, there is the need for the manual process in the conventional methods.

SUMMARY OF THE INVENTION

In view of the foregoing and other problems, drawbacks, and disadvantages of the conventional methods and structures, an object of the present invention is to provide a method and apparatus of method signature adaptation for dynamic Web Service Invocation for heterogeneous Web Services.

Another object of the invention is to dynamically find Web services that fit the needs of one or more parts of the business process.

Yet another object of the invention is to automatically adapt input and output parameters to eliminate the need for manual adaptation.

Still another object of the invention is to dynamically bind and/or invoke Web services by a business application that is part of a business process.

In a first aspect of the present invention, a method for adapting an input parameter, the method includes receiving an invocation request including an input parameter in a first format; retrieving MetaWSDL wherein said MetaWSDL is a universal XML representation which includes semantic information of a Web service method signature; and invoking a MetaWSDL processor to adapt the input parameter to a second format using the retrieved MetaWSDL.

In a second aspect of the present invention, a method for adapting a Web service output parameter, includes receiving an output parameter in a first format; retrieving MetaWSDL, wherein said MetaWSDL is a universal XML representation which includes semantic information of a Web service method signature providing the output parameter; and invoking a MetaWSDL processor to adapt the output parameter to a second format using the retrieved MetaWSDL.

In a third aspect of the present invention, a method for method signature adapting an input parameter, the method includes parsing the input parameter using MetaData; and invoking MetaWSDL to adapt the input parameter.

In a fourth aspect of the present invention, a method for generating a MetaClient preference file in a MetaClient library for storing information regarding a preferred set of Web services, includes looking up UDDI registries for each preferred Web service; and storing the location of each preferred Web service and associated method names in a MetaClient library.

In a fifth aspect of the present invention, an apparatus for method signature adaptation, the apparatus includes: a MetaObject library including self-describing objects defined in MetaWSDL; a MetaClient library including a preferred library of Web services; and a MetaWSDL processor adapted to process MetaWSDL, to adapt parameters and to invoke Web services dynamically, wherein said MetaWSDL is a universal XML representation which includes semantic information of Web services method signatures.

In a sixth aspect of the present invention, a Web service description language for automatic method signature adaptation, includes instructions in MetaWSDL which includes semantic information of Web services method signatures.

In a seventh aspect of the present invention, a computer readable medium storing instructions for adapting an input parameter which when executed by one or more processors, causes the processors to perform receiving an invocation request including an input parameter in a first format; retrieving MetaWSDL wherein said MetaWSDL is a universal XML representation which includes semantic information of a Web service method signature; and invoking a MetaWSDL processor to adapt the input parameter to a second format using the retrieved MetaWSDL.

In an eighth aspect of the present invention, a computer readable medium storing instructions for adapting an output parameter which when executed by one or more processors, causes the processors to perform: receiving an output parameter in a first format; retrieving MetaWSDL, wherein said MetaWSDL is a universal XML representation which includes semantic information of a Web service method signature providing the output parameter; and invoking a MetaWSDL processor to adapt the output parameter to a second format using the retrieved MetaWSDL.

In a ninth aspect of the present invention, a computer readable medium storing instructions for adapting an input parameter which when executed by one or more processors, causes the processors to perform: parsing the input parameter using MetaData; and using MetaWSDL to adapt the input parameter.

In a tenth aspect of the present invention, a computer readable medium storing instructions for generating a MetaClient preference file in a MetaClient library for storing information regarding a preferred set of Web services which when executed by one or more processors, causes the processors to perform: looking up UDDI registries for each preferred Web service; and storing the location of each preferred Web service and associated method names in a MetaClient library.

In an eleventh aspect of the present invention, a computer readable medium storing MetaData for describing semantic information for Web services.

In a twelfth aspect of the present invention, a MetaWSDL processor for adapting an input parameter, the MetaWSDL processor including: an input adaptation device which adapts and input parameter in a first format to a second format; and a dynamic invocation device for invoking a Web service by providing said input parameter in said second format.

In a thirteenth aspect of the present invention, a MetaWSDL processor for adapting an output parameter, the MetaWSDL processor including: a dynamic invocation device for receiving an output parameter in a first parameter from a Web service; and an output adaptation device for adapting said output parameter from said first parameter to a second parameter.

Semantic information for describing and quantifying input parameters is collectively termed "MetaData" in this invention. For example, MetaData definitions can be used to provide unit information for an input, which is important especially when conversion between units are required, such as between oz and liter, foot and meter, and Celsius and Fahrenheit. Also, MetaData definitions can be used to correctly format the input before the Web Service is invoked without having human intervention. For example, a business application receives its input to the Web Services from a user or an external media, but the input is in a different format than the one defined in the WSDL. Without manual adaptation of the input, the Web Service cannot be correctly invoked nor can the desired results be obtained.

The automatic adaptation of input/output parameters issue is by far the most difficult and the least developed area in term of utilizing Web Services where there are toolkits and framework that facilitate both issues 1) and 3). For issue 1), there are IBM® Web Service Toolkit (WSTK) and UDDI4J toolkits and APIs that alleviate portions of the programming tasks from the application; for issue 3), there is Web Service Invocation Framework (WSIF) that provides dynamic Web Service invocation. However, there has been no toolkit or framework for automatically adapting input/output parameters, but it is the most crucial.

In order to fully realize the potentials of Web Services in Dynamic e-Business, automatically adapting input/output parameters is a must. This is because the dynamic nature of Web Services where many new ones can be published and old ones removed/updated at any time. Therefore, the ability to dynamically bind/invoke newly published/updated Web Services is essential, absolutely requires the capability of automatically adapting input/output parameters.

Adaptation of input parameters ensure that the Web Services can be invoked correctly while adaptation of output parameters ensure that the results from the Web Services are meaningful, and not just that the number is correct. This invention proposes a framework to adapt user input as well as output results to the correct format and/or units that are required to invoke the target Web Service as well as to return the correct results to the client. This invention can be used by all applications that want to dynamically invoke Web Services and obtain correct as well as meaningful results.

To address the above mentioned e-business integration issues, an exemplary embodiment of this invention is a method and apparatus of method signature adaptation for dynamic Web Service Invocation for heterogeneous Web Services, including the following components:

A) MetaWSDL—the universal XML representation to define MetaData;

B) MetaObject Library—a library of self-describing objects defined
in MetaWSDL, including two types: 1) basic MetaObject, 2) complex/pluggable MetaObject, for handling data conversions;

C) MetaWSDL Processor—process MetaWSDL, adapt parameters and invoke Web Services dynamically;

D) Meta Client Library—build a preferred library of Web Services by retrieving the latest ones; and E) Framework to use the above components to author and publish MetaWSDLs, dynamically adapt input and output method signatures, automatically invoke Web Services for dynamic e-business integration.

An exemplary embodiment of this invention is a framework and mechanism to automate the process for dynamic Web Services invocation; it eliminates the need for manual mapping of input parameters with WSDL method signatures and addresses the issues of automatic adaptation for input parameters and output results of target Web Services, which enables dynamic Web Services invocation and obtains the intended results in desired units, such as money (dollars vs. yens) or measurement (feet vs. meters; oz vs. liter). This automatic adaptation is not possible with the current WSDL definitions. The inventive MetaWSDL, a universal XML representation, includes additional semantic information of Web Services method signatures, which are not part of the current WSDL standards. Using both WSDL and MetaWSDL, business application software can not only get the basic service interface definitions from WSDL but also the semantic information about input and output from MetaWSDL, which enables the Web Service to be dynamically invoked. In other words, using the unit or format information about the parameters in the MetaWSDL, the parameters of the method can be correctly constructed.

An exemplary embodiment of the present invention meets the following goals of the method signature adaptation for dynamic Web Service invocation:

1) Define data schema of MetaWSDL to provide additional information needed for method signature adaptation;
2) Create and publish MetaWSDL in a standard way;
3) Define MetaObject Library, which handles data transformation for MetaObject defined in the MetaWSDL schema;
4) Eliminate manual process of constructing and matching input parameters defined in the WSDL method signatures;
5) Generate, on the client side, an up-to-date library of predefined, preferred Web Service names and method names for building correct invocation requests;
6) Automate Web Service invocation; and
7) Eliminate manual process of adapting output results to the correct unit or format.

BRIEF DESCRIPTION OF THE DRAWINGS

The foregoing and other purposes, aspects and advantages will be better understood from the following detailed description of exemplary embodiments of the invention with reference to the drawings, in which.

DETAILED DESCRIPTION OF EXEMPLARY

Embodiments Of The Invention

First, several terms and mechanism are introduced. MetaData is used as a mechanism to communicate the semantic information of the Web Services to business applications so that the applications can invoke Web Services dynamically; MetaData is essential to solving the Web Services dynamic invocation problem in e-business integration. "Method signature adaptation" is the process of parsing the MetaData (or semantic definitions of the Web Services), automatically constructing the input parameters, as well as adapting the inputs and outputs to the proper format/units. Lastly, "MetaWSDL", a universal XML representation, is proposed in this invention to describe MetaData; it is complementary to the current WSDL and enriches the semantic definitions of Web Services.

Figure 1:
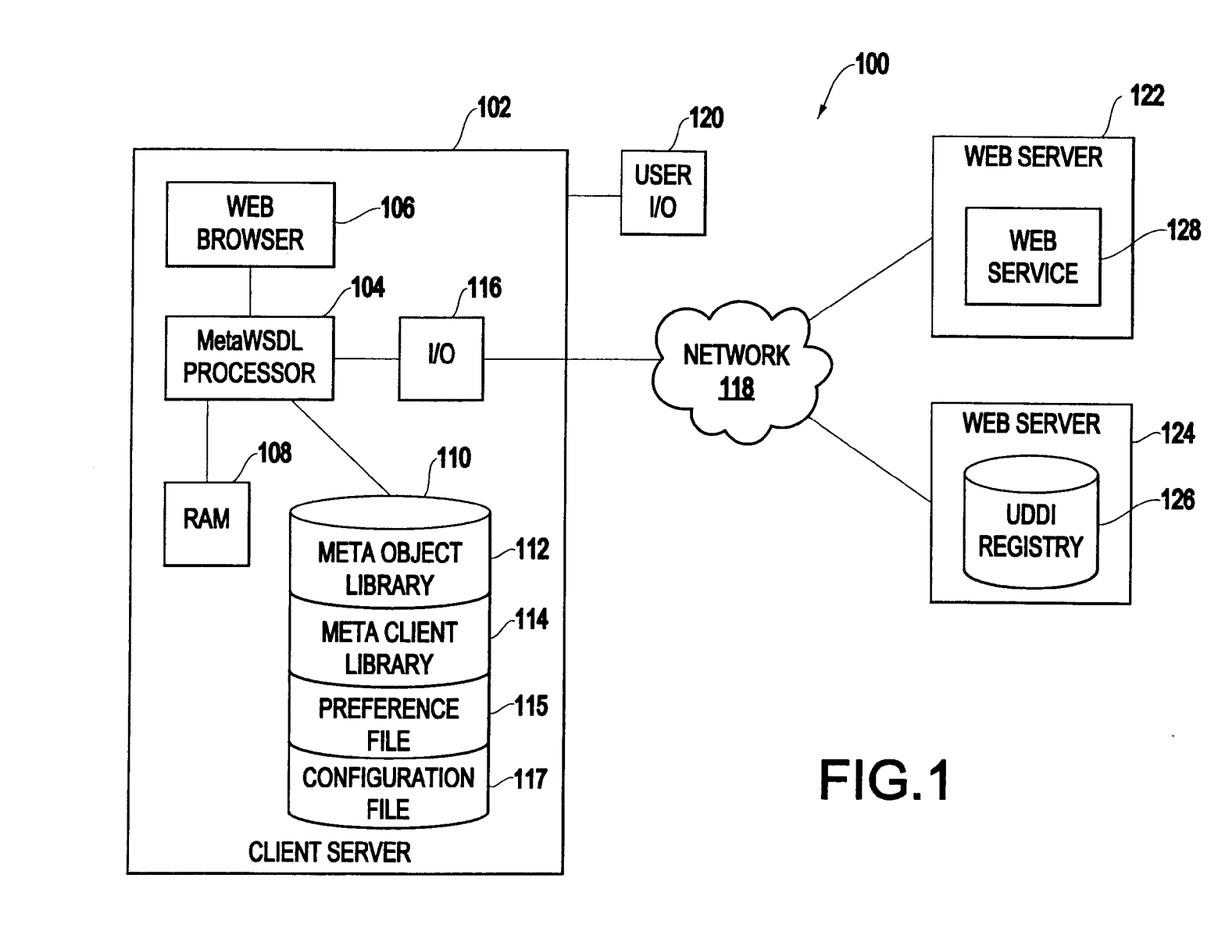
FIG. 1 is a schematic representation of one exemplary embodiment of an apparatus 100 in accordance with the invention.
Figure 2:
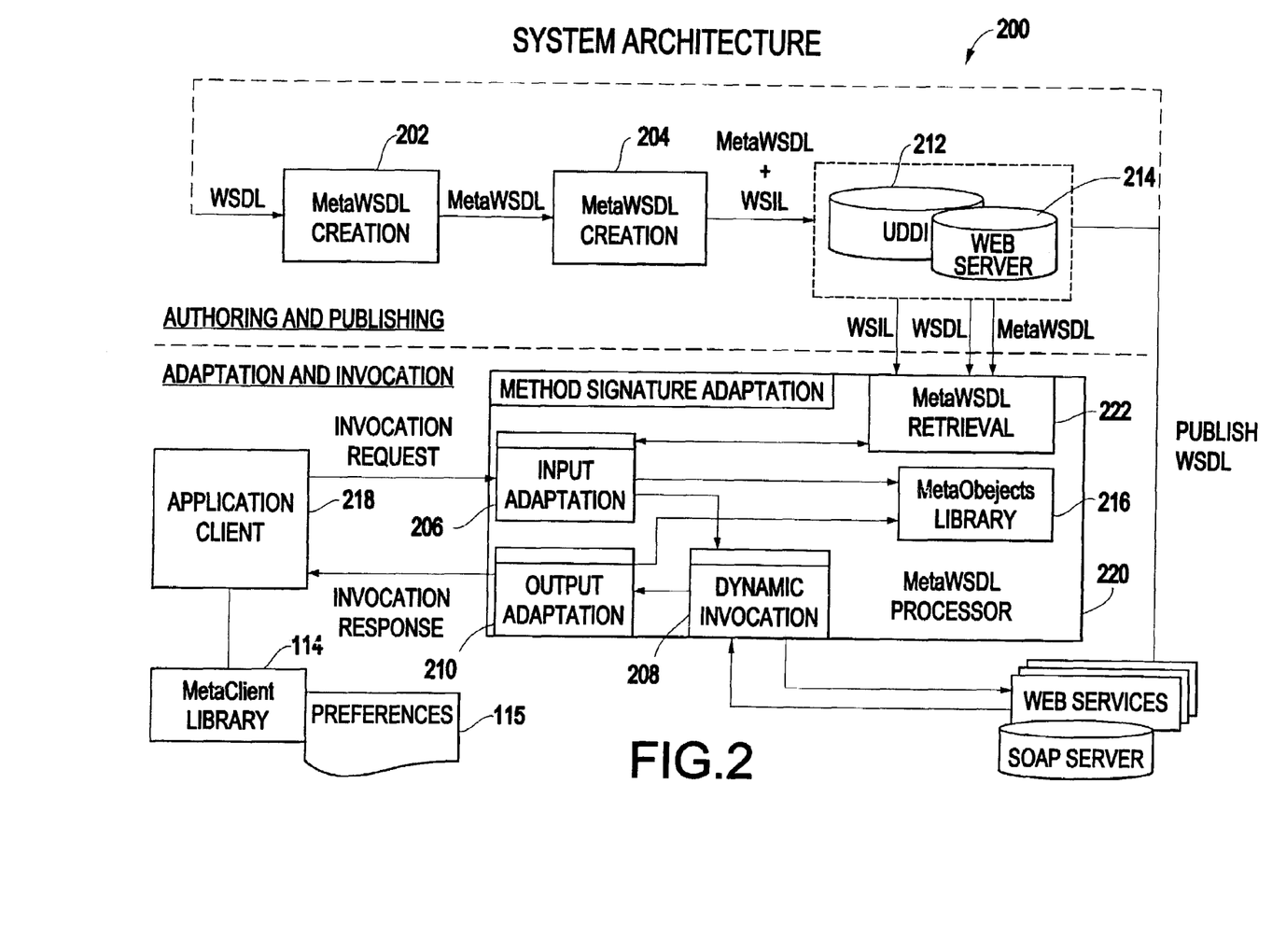
FIG. 2 is a schematic representation of the system architecture 200 for one exemplary embodiment in accordance with the present invention.
Figure 3:
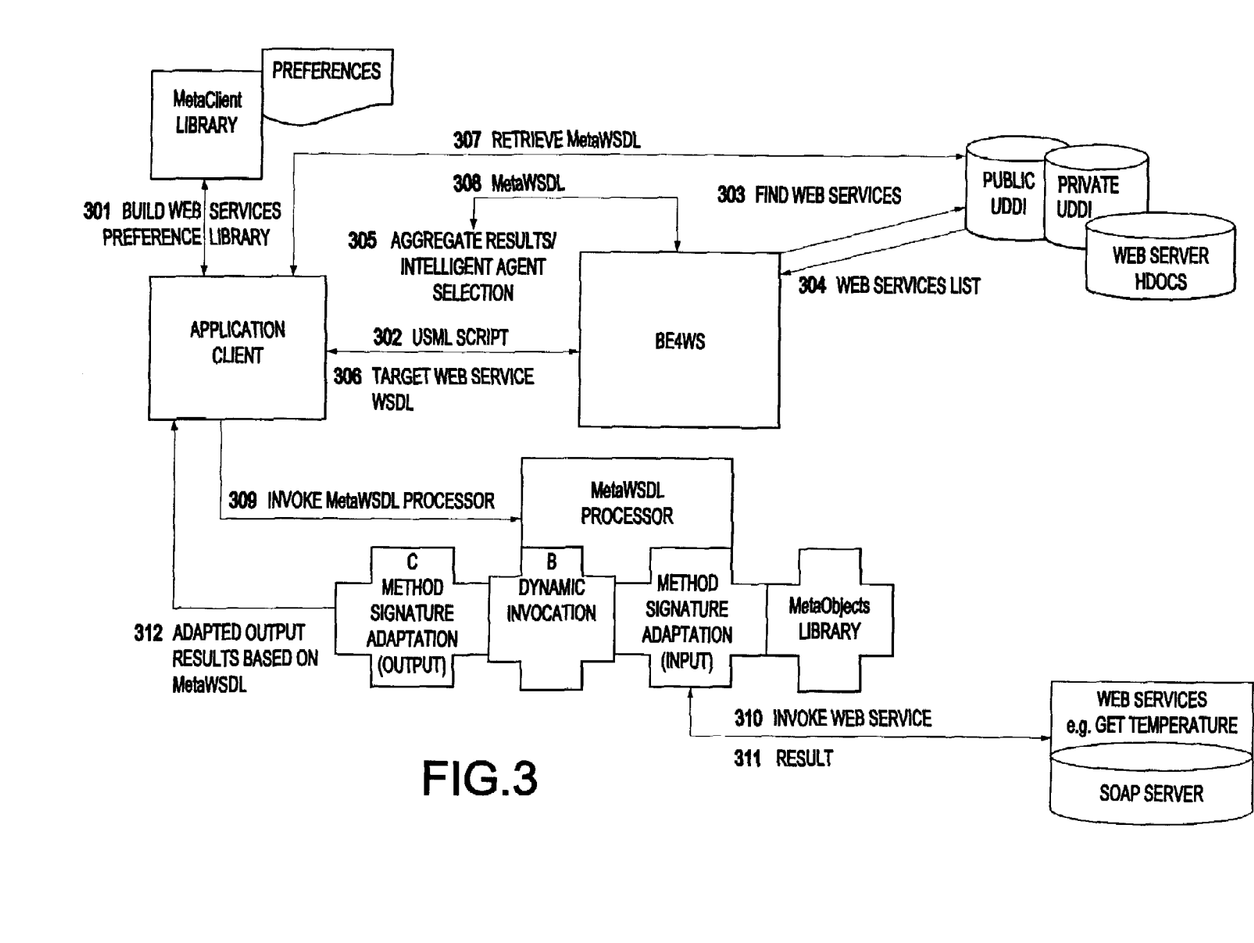
FIG. 3 is a schematic representation of an exemplary control routine 300 in accordance with the present invention.

Referring now to the drawings, and more particularly to FIGS. 1-3, there are shown exemplary embodiments of the method and structures according to the present invention.

FIG. 1 shows a schematic diagram of one exemplary embodiment of the invention. The apparatus 100 of the invention includes a client server 102 which includes a MetaWSDL processor 104 in communication with a Web browser 106, RAM 108 and a database 110. The database 110 includes a MetaObject library 112, a MetaClient library 114, a Preference file 115 and a configuration file 117. The MetaWSDL processor 104 also communicates with I/O 116 which, in turn, communicates with a network 118. The Web browser 106 is in communication with a user I/O 120. The network 118 allows selective communication between the client server 102 and web servers 122 and 124. At least one of the web servers 124 includes a UDDI registry 126 and at least one of the web servers 122 includes a Web service 128.

Although not shown, the user I/O 120 may include any number of devices to interface with a user of the system 100. The user I/O 120 may include, for example, a keyboard, a microphone, a pointer device such as a mouse, trackball or pen, or any other user interface device.

The organization of the following description first discusses four components A), B), C), and D) of an exemplary embodiment of the present invention as listed below, followed by a description of a Framework for the system architecture, in which section five uses the four components described before. Together, they accomplish the goal of automatic signature adaptation for dynamic Web service invocation in accordance with the present invention.

A) MetaWSDL:

Referring now to FIG. 2, in order to convert input parameters, MetaWSDL is created at 202 to include the semantic information, which are embodied by MetaObjects. Each MetaObject represents a real life object or notion, such as zipcode, a state name, a measurement unit (e.g. kg, ounce), or a currency (USDollar or FrenchFranc, etc.) and handles data conversions of input parameters and output results.

There are two main types of semantic information for method signature adaptation: 1) Specifications for input parameter adaptation many-to-one mapping. The designated input type to the Web Service is denoted by the keyword 'unit' as specified in "unit="xsd: Kg"" where a MetaObject of 'Kg' embodies the actual Kilogram unit and handles conversions from itself to other known units, such as 'Pound'. The keyword 'native unit' denotes the unit format native to the locale as obtained by the business application. When 'nativeunit' is not the same as 'unit', a MetaWSDL processor automatically performs a conversion, converting from 'nativeunit' to 'unit', and the mapping can be many 'nativeunits' to one 'unit' before the Web Service can be successfully invoked.

Further, there is 2) Specifications for output result adaptation one-to-many mapping. When 'unit' is not the same as 'native unit', a MetaWSDL processor automatically performs a conversion, converting from 'unit' to 'native unit', and the mapping can be one 'unit' to many 'native units' before the correct result can be returned to the client.

It is important to note that MetaWSDLs are not only useful to automate method signature adaptation using programs but also can serve as guides to application developers as manual adaption of method signatures.

The examples that follow describe two types of input adaptations: List 1 using basic MetaObject, List 2 using the extensive and pluggable MetaObjects; List 5 describes output adaptation using a basic MetaObject.

List 1: Example MetaWSDL for Weight Unit Adaptation Using Simple MetaObjects.

```
<?xml version="1.0"?>
<metaWsdl xmlns="
http://schemas.metaWsdl.org/ws/metaWsdl/">
    <messageMeta name="InShippingQuoteRequestMeta">
        <part name="meth1_inType1" unit="xsd: Kg"/>
            <nativeunit name="Pound">
                <conversion mapping= "none"/>
            </nativeunit>
            <nativeunit name="Ounce">
                <conversion mapping= "none"/>
            </nativeunit>
            <nativeunit name="Ton">
                <conversion mapping= "none"/>
            </nativeunit>
    </messageMeta>
    <extension>
        <description>
```

This is an example extension which allows a description of how to create the native data and invoke a Web Service.

```
        </description>
    </extension>
</metaWsdl>
```

In List 1, in order to perform the method signature adaptation for the input parameters, the above MetaWSDL is created to include the semantic information, which introduces four MetaObjects in the definitions, i.e. the "kg", "pound", "ounce", and "ton", basic MetaObjects. The 'unit' specifies that the input for the InShippingQuoteRequest Meta Web Service is in "kg", and the 'nativeunit' which is the input format the application client has, and it can be "pound", "ounce", or "ton", for example. Thus, a conversion is required to convert from the 'nativeunit' of "pound", "ounce", or "ton" to the "unit" of "kg" using the MetaObjects defined in the MetaObject Library for the conversion.

For "basic" MetaObjects such as "kg" and "pound", "ounce", or "ton", no conversion mapping is specified in the MetaWSDL; a default method supported by the basic MetaObject is used to perform the conversion. Note that there is an extension tag shown in List 1. This is an optional tag which is used to carry more information about the invocation process. For example, one can show an example native data within this optional tag.

List 2: Example MetaWSDL Using Complex or Extensive MetaObject for XML String Transformation.

```
<?xml version="1.0"?>
<metaWsdl xmlns="
http://schemas.metaWsdl.org/ws/metaWsdl/">
    <message Meta name="InSearchUDDIRequestMeta">
        <part name="meth1_inType1" unit="xsd: USML"/>
            <nativeunit name="xsd: string">
                <conversion mapping="String2USML_MetaObject"/>
            </nativeunit>
    </messageMeta>
    <extension>
        <sampleinput>
            OR
            Business
            %trans
            Private UDDI
                http://9.2.168.233:80/services/uddi/inquiryAPI
            Business
            UPS
            Private UDDI
                http://9.2.168.233:80/services/uddi/inquiryAPI
        </sample input>
    </extension>
</metaWsdl>
```

In List 2, in order to perform the method signature adaptation for the input parameters, the above MetaWSDL is constructed to include the semantic information, which introduces two complex or custom MetaObjects, i.e. USML and String2USML_MetaObject, in the definition. The 'unit' specifies that the input for the InSearchUDDIRequestMeta Web Service is "USML", and the 'native unit' specifies that the application client obtains is a regular string.

The conversion mapping specifies the customized MetaObject "String2USML_MetaObject", which will be used to handle the conversion from the 'nativeunit' of "string" to the 'unit' "USML", a well-formed UDDI Search Markup Language (USML) string, and then invoke a target Web Service of SearchUDDI. The content included within extension tag in List 2 are extracted and shown in List 3.

List 3: Example Input Obtained by Application Client for Use with MetaWSDL in List 2.

OR
Business
% trans
Private UDDI
http://9.2.168.233:80/services/uddi/inquiryAPI
Business
UPS
Private UDDI
http://9.2.168.233:80/services/uddi/inquiryAPI In the above example of input, there are two search requests specified and the operator used is 'OR'. The first request is to search by business with '% trans' as business name using the private UDDI with its URL. The second request is to search by business with 'UPS' as business name using the private UDDI with its URL.

The input is read and transformed into the USML search script by the String2USML_MetaObject as set forth in List 4 below.

List 4: Example USML String Converted by Extensive MetaObject String2USML_MetaObject.

```
<?xml version="1.0"?>
<!DOC TYPE Search SYSTEM "UDDISearch.dtd">
<Search>
    <ProcessId>9999</ProcessId>
    <Query>
        <Source> Private UDDI</Source>
        <Source URL>
http://9.2.168.233:80/services/uddi/inquiryAPI</Source URL>
        <Business Name >%trans</Business Name>
        <Find By> Business</Find By>
    </Query>
    <Query>
        <Source> Private UDDI</Source>
        <Source URL>
http://9.2.168.233:80/services/uddi/inquiryAPI</Source URL>
        <Business Name >UPS</Business Name >
        <Find By> Business</Find By>
    </Query>
    <AggOperator>OR</AggOperator>
</Search>
```

In List 5 that follows, the example shows the output result adaptation for currency. In the example below, several basic MetaObjects are defined, i.e. "USDollar", "BritishPound", "JapaneseYen", "GermanMark", and "FrenchFranc". These currency units are specified as 'nativeunit', which means the currency is from the locale or country of origin where application client runs, and the application can receive any one of such 'nativeunit's as input, the 'unit' denotes that the Web Service output format is "USDollar". When 'unit' is not the same as 'nativeunit', MetaWSDL processor automatically performs an adaptation to convert "USDollar" to whichever currency specified by 'nativeunit' before returning the result back to the application.

List 5: Examplary MetaWSDL of Output Result Adaptation for Currency.

```
<?xml version="1.0"?>
<MetaWsdl xmlns="http://schemas.metaWsdl.org/ws/metaWsdl/">
<messageMeta name="OutShippingQuoteResponseMeta">
    <part name="meth1_outType" unit="xsd: USDollar"/>
        <nativeunit name="BritishPound">
            <conversion mapping= "none"/>
        </nativeunit>
        <nativeunit name="JapaneseYen">
            <conversion mapping= "none"/>
        </nativeunit>
        <nativeunit name="GermanMark">
            <conversion mapping= "none"/>
        </nativeunit>
    <nativeunit name="FrenchFranc">
        <conversion mapping= "none"/>
    </nativeunit>
</messageMeta>
</metaWsdl>
```

B) MetaObject Library:

The purpose of the MetaObject Library is to assist in method signature adaptation. The MetaWSDL Processor to be discussed next uses the MetaObject Library to perform required data conversions of input parameters and output results. The MetaObject Library provides a set of data transformation objects, which can be implemented as Java Classes or other application packages to handle format/unit conversions, XML translation script, plug-in modules and so on.

The MetaObject Library includes two parts: MetaObjects, and the MetaObject library configuration file.

MetaObjects—Two Types in the Library:

a) Basic MetaObjects—

These data transformation objects handle simple conversions of measurement, temperature, date, currency, etc; no conversion mapping needs to be specified For example, the units of weight may be kilogram or pound. The units of measurement can be mile or foot; oz or liter. The units of temperature are Celsius or Fahrenheit. Date formats include USDate, EuropeanDate, Week, and Day. The units of currency are USDollar, BritishPound, JapaneseYen, RMB and so forth. The address includes StreetNumber, City and Zipcode. No conversion mapping is specified for Basic MetaObject as conversion functions for these Basic MetaObjects are defined in MetaObject themselves.

b) Custom/Pluggable MetaObjects—

The MetaObject library comes with several extensible MetaObjects, and a user can define their own MetaObjects that get plugged into the MetaObject library. The conversion mapping must be specified for the custom MetaObjects. These are MetaObjects that are customizable and pluggable. For example, Math-MetaObjects for Math Markup Language (MML) are defined to process MML when present and to perform Math calculations using the specified conversion.

Another example may be the USML-MetaObject for UDDI Search Markup Language (USML), which is a MetaObject that constructs USML script using the input parameters from the application client. A Weather-MetaObject is yet another example of a MetaObject, defined to construct a specialized XML request for a Weather Web Service for weather information. Other MetaObjects can also be defined to handle other kinds of data transformation and processing.

(c) MetaObject Library Configuration File

The purpose of the configuration file, XML or text, etc., is to define all the MetaObjects that the MetaWSDL processor knows about. The MetaObjects can be simple, extensible or user defined. Whenever there are new user-defined MetaObjects, simple or custom/pluggable, they must be added to the configuration file for the MetaWSDL processor to be able to invoke them at runtime. The configuration file is a mechanism that the custom MetaObjects can be plugged into the MetaObject library and be known to the system without any code changes.

List 6 below shows three examples of MetaObjects: Celsius, the basic type, USML, the complex type provided by the MetaObject Library; and the UserDefinedMetaObject, which is also a complex type but is provided by a user and gets plugged in to the MetaObject Library.

List 6: Example MetaObject Library Configuration File

```
<?xml version="1.0"?>
<meta Wsdl xmlns ="http://schemas.metaWsdl.org/ws/metaWsdl/">
    <meta Libraryconfig>
        <metaObject name="Celsius">
            <class name="Celsius"/>
            <package name="com.ibm.UDDI.metaobjects"/>
        </metaObject>
        <metaObject name="USML">
            <class name="UDDI Search"/>
            <package name="com. ibm. UDDI. Business Explorer"/>
        </metaObject>
```

-continued

```
<metaObject name="UserDefinedMetaObject">
    <class name="UserDefinedClassName"/>
    <package name="my.com.userdefinedpackage"/>
  </metaObject>
  </metaLibraryconfig>
</metaWsdl>
```

C) MetaWSDL Processor:

The MetaWSDL processor is the runtime central control of this framework. Its main functions are to process MetaWSDL, to adapt parameters and to invoke Web Services dynamically. The MetaWSDL processor uses other components of the framework (e.g. MetaWSDL and MetaObject Library) to accomplish these functions. The details of how the MetaWSDL Processor works are described in the System Architecture below and shown in FIG. 2, and include:

1) Input Method Signature Adaptation process;
2) Dynamic Web Service invocation using the adaptation mechanism; and
3) Output Signature Adaptation process.

D) MetaClient Library:

The MetaClient Library provides APIs to invoke an advanced UDDI search engine to lookup UDDI registries, retrieving a preferred set of Web Services. Meanwhile, it stores the location of WSDLs and the method names. Preferences are defined in a preference file (text or XML). The Library may provide a set of default preference files. For example, the default preference files may be based on the locale, e.g. European, North America, South America, Africa, Asia, etc. (see examples below). An application developer can also make modifications as needed. A MetaClient Preference Library is built using the Web Service name, WSDL location and method name. The MetaClient Library APIs store events and updates one or multiple UDDI registries, i.e. when a new Web Service is published or an existing Web Service is unpublished, the MetaClient Preference Library is updated with the latest information about Web Services. The MetaClient Library APIs should be invoked prior to invoking the MetaWSDL processor to keep the client side information up to date. The MetaClient Library APIs provides a mechanism for the application to parse its input based on the MetaWSDL and, thus, simplifies the input parameter passing to the Web Services and eliminates the manual matching process.

The MetaClient library can be tailored to different applications by customizing the search criteria for the advanced UDDI search engine. For example, shipping planning applications may be interested in transportation Web services while financial applications may be interested in statistical Web Services.

Furthermore, in dynamic e-business applications, an application client does not always know which Web Service will be invoked at all times because different Web Services will be invoked based on different business rules, context or preferences. If the rules or preferences are defined, the application client can use an advanced UDDI search Engine such as BE4WS (Business Explorer for Web Services) to find the correct Web Services for a business context. For example, if the cost of shipping an order is bigger than $100, Transportation Service A may be selected and invoked; otherwise, the Transportation Service B will be invoked instead. Also, when the shipping order status tracking is needed, the Tracking Web Service may be invoked.

An exemplary embodiment of the system architecture 200 of method signature adaptation for dynamic Web Service invocation is shown in FIG. 2. There are five major processes, and they use the main components described above, such as MetaWSDL, MetaWSDL Object Library, etc.:

1) MetaWSDL Authoring process 202,
2) MetaWSDL publishing process 204,
3) Input Signature Adaptation process 206,
4) Dynamic Web Service invocation process 208 using the adaptation mechanism, and
5) Output Signature Adaptation process 210.
1) MetaWSDL Authoring Process:
MetaWSDL may be created using a MetaWSDL Creation Tool or a text editor based on the WSDL of a Web Service. Some examples of MetaWSDL are listed below to illustrate its usage.

The resulting MetaWSDL is referenced by a Web Service Inspection Language (WSIL) document or other documents such as a regular text file. In this invention, the inventors used WSIL document to reference the MetaWSDL. There are at least two ways to locate and retrieve the MetaWSDL:

A. Use the same file name but different file extension where both files locate in the same location, and
B. Store all mapping information in one WSIL to map between each WSDL and the complementary MetaWSDL In this disclosure, one WSIL file is used to build the mapping between the WSDL and MetaWSDL.

The reason the inventors choose WSIL document (WS-Inspection) for carrying MetaWSDL (*.mws) is that the information contained within the description elements are extensible and customizable. These elements can be used to point to service description documents of various forms to allow users to process only the ones that they find useful.

One example of such elements contains the "referencedNamespace" attribute, which identifies the name space to which the referenced document belongs. An example of the value of a "referencedNamespace" attribute for a description element that points to a WSDL document would be "http://schemas.xmlsoap.org/wsdl/" (see List 5 "Example WSIL document" below for details). The "referencedNamespace" attribute helps the users of WS-Inspection documents to determine if the referenced description document is of interest to them. The optional location attribute is used to provide the actual reference to the description element.

One extensibility element that this invention proposes to add under the description element is to provide a pointer to MetaWSDL, which includes semantic information needed for method signature adaptation. The document name space specified by the referencedNamespace attribute is "http://schemas.xmlsoap.org/metawsdl/".

In an example WSIL shown in List 7 below, two services are listed, enclosed between the <service> and </service> tags. Each service contains two description elements with one having a "referencedNamespace" attribute of WSDL and one of MetaWSDL. The location attributes indicate where the WSDL or MetaWSDL can be retrieved, respectively.

List 7: Sample WSIL Document

```
<?xml version="1.0"?>
  <inspection xmlns="http://schemas.xmlsoap.org/ws/2001/10/
  inspection/">
<service>
    <description
referencedNamespace="http://schemas.xmlsoap.org/wsdl/"
      location="
    http://invocation4ws1.com/services/getTemperature.wsdl" />
```

```
            <description
referencedNamespace="http://schemas.xmlsoap.org/metawsdl/"
                                      location="
http://invocation4ws2.com/MetaWSDLs/getTemperature.mws" />
        </service>
        <service>
            <description referencedNamespace
="http://schemas.xmlsoap.org/wsdl/"
              location="http://invocation4ws1.com/services/be4ws.wsdl"/>
            <description
referencedNamespace="http://schemas.xmlsoap.org/metawsdl/"
location="http://invocation4ws2.com/MetaWSDLs/be4ws.mws" />
                                         </service>
    </inspection>
```

One primary function provided by the WS-Inspection specification is to define the locations where one can access WS-Inspection documents. There are two conventions that make the retrieval of WS-Inspection documents easy:

A. Fixed Name WS-Inspection Documents—

The fixed name for WS-Inspection documents is "inspection.wsil." A document with this name can be placed at common entry points for a Web site. For example, if the common entry point is http://invocation4WS.com, then the location of the WS-Inspection document would be http://invocation4WS.com/inspection.wsil.

B. Linked WS-Inspection Documents—

References to WS-Inspection documents may also appear within different content documents, such as HTML pages.

2) MetaWSDL Publishing Process:

The combination of the WSDL, MetaWSDL, and the Web Service Inspection Language (WSIL) has the potential to satisfy the dynamic invocation pattern for a Web Service request. As mentioned prior, a MetaWSDL carries all semantic information for a method signature that is not included in the WSDL, which carries the basic method signature information for a Web Service. WSIL provides links to the location of MetaWSDLs.

Both MetaWSDLs and WSILs need to be published for the users to retrieve. There are at least two ways that they can be published:

A. Publish to a private UDDI registry 212 through the enhanced APIs; and

B. Publish to a regular Web Server 214 which provides a hyperlink to the published MetaWSDL and WSIL.

As usual, Web Services deployed on SOAP server are required to have their interfaces published to a UDDI registry or to a WSIL document on a Web Server. The hyperlink of the WSDLs are assigned by the Web server or UDDI registry server.

Furthermore, MetaWSDL, WSIL documents and WSDL can be published on different servers. In addition, all MetaObjects defined by MetaWSDL schema should be stored in the MetaObject Library 216.

The next process is adaptation and invocation of a Web service using the resulting MetaWSDL.

3) Input Signature Adaptation Process:

This process includes at least the following two major steps:

A) MetaWSDL Retrieval

When an application client 218 sends an invocation request to the MetaWSDL processor 220, the method name and the WSDL location must be specified. Then the MetaWSDL Retrieval module 222 makes a call to the web server 214, which hosts MetaWSDL, WSIL, and WSDL documents, to retrieve the WSIL document. From this WSIL document, based on the locations of the WSDL, the corresponding MetaWSDL can be obtained. Then the MetaWSDL processor 220 will perform the method signature adaptation based on the retrieved MetaWSDL and the WSDL.

B) Parameter Input Adaptation

The method signature adaptation includes two types of adaptations. The first one is input parameter adaptation 206. For example, if there is unit or format information about the input parameters of the method in the MetaWSDL, the input parameters can be correctly constructed. There are at least two ways to perform the adaptation: 1) manual construction, and 2) automatic construction. When the business application invokes the MetaWSDL processor proposed in this invention, automatic construction is always performed, which refers to the automatic data transformation by a MetaObject in the MetaObject Library 216 based on the conversion schema. For instance, if a method of a Web Service requires a specific XML string as input, the application client needs to convert a set of input strings to the required XML string for the method invocation. Manual construction means that the application developer needs to manually construct the input parameters based on the description and guide described in MetaWSDL.

4) Dynamic Web Service Invocation Using Adapted Input:

At this stage, the MetaWSDL processor 220 will invoke the method requested by the application client 218 using input parameters already adapted using MetaWSDL. The invocation mechanism can be either the regular SOAP RPC client or the Web Service Invocation Framework (WSIF) client.

5) Output Signature Adaptation Process 210:

This stage adapts the output to the correct unit or format as defined in the MetaWSDL following the "Dynamic invocation" step described next. For example, if the unit of a stock quote from a Web Service invocation is USDollar, but the desired unit for the quote for an UK application is UKPound, the quote is automatically converted to UKPound based on the MetaWSDL before returning it back to the application client 218.

FIG. 3 illustrates an exemplary embodiment of an integration process of signature adaptation and Web Service dynamic look up and invocation in accordance with the invention. There are at least two scenarios for an application client to invoke a Web service:

A. The WSDL Location is Known—

In this case, the overview URL of the business is given by the application client 218 directly. The process of signature adaptation and invocation is described above in relation to the system architecture of FIG. 2.

B. The WSDL Location is not Known—

In this case, the application client 218 needs to submit the UDDI search via USML to the MetaWSDL Processor, which will look up the desired Web Service in UDDI and then find the overview URL for the business in the system architecture.

In both cases, the application client 218 must be able to specify to the MetaWSDL Processor the desired method name to be invoked dynamically as in most cases there are multiple method names defined within a single WSDL. This scenario is ensured by following the MetaClient Library mechanism as described above.

The following steps describe the exemplary process flow as illustrated in FIG. 3. In step 301, the application client invokes the MetaClient Library to store a preferred set of Web sServices in the MetaClient Preference Library by looking up UDDI registries and selecting based on a preference file, or a default file with modifications if desired, for the locale, e.g. European, North America, Asia, etc. (see details in MetaClient Library Section above). The Overview URL is found in one of two ways (Steps 302-306): 1) If the Overview URL of the WSDL is not known, the system retrieves it, which can be done via a UDDI search engine, e.g. BE4WS, which parses incoming search requests specified as USML script, searches multiple UDDI sources, aggregates search results, and returns a target Web Service; and 2) the Overview URL of the WSDL is known before the invocation.

Retrieve MetaWSDL:

Steps 307-308, invoke MetaClient Library APIs to retrieve the corresponding MetaWSDL for the desired WSDL found in step 302-306. The input is parsed. That is MetaClient Library APIs are used to parse input based on the MetaObjects defined in the MetaWSDL.

Invoke MetaWSDL Processor:

Step 309, the parameters in MetaObjects type, method name, locations of overview URL, MetaWSDL, and preference file (for output adaptation), are passed.

On the server MetaWSDL Processor side:

In step A, the input parameter is adapted using MetaObject Library. Then to invoke the Web Service in step B (Steps 310-311), either SOAP RPC client or WSIF client can be used passing the adapted input parameters and receive results.

In step C (Step 312) the output results are adapted using MetaObject Library to match the correct unit/format as specified in the MetaWSDL and return the adapted output to the application client.

The following example is used to illustrate why a MetaWSDL is needed and how to create a MetaWSDL for a real Web Service. Meanwhile, the output adaptation for get Temperature Web Service is also shown as follows:

List 8: WSDL Input Parameters

```
<message
    name="IngetTemperature">
  <part name="meth1_inType1"
    type="xsd: string"/>
  <part name="meth1_inType2"
    type="xsd: string"/>
  <part name="meth1_inType3"
    type="xsd: float"/>
</message>
```

The WSDL only defines the parameter numbers and types for the getTemperature Web Service. There is no other information associated with the parameters.

List 9: WSDL Output Parameters:

```
<message
    name="OutgetTemperature">
  <part name="meth1_outType"
    type="xsd: float"/>
</message>
```

The output type of getTemperature Web Service is float. But there is no unit information or formats about this output result.

In order to perform the method signature adaptation for the input parameters, the inventors constructed the following MetaWSDL to include the semantic information, which introduces two MetaObjects in the definitions, i.e. the Zipcode and the Day Basic MetaObjects. The first parameter is Zipcode MetaObject for the US zipcode format, and the second is the Day MetaObject for number of days.

The keyword 'unit' specifies the MetaObject 'Zipcode' is used in the input to the getTemperature method. The keyword 'nativeunit' means what kind of the native format the input obtained by the business application. When 'nativeunit' is not the same as 'unit', a conversion needs to take place to convert from the 'nativeunit' to 'unit' before the method can be invoked. In this case, the 'nativeunit' is also in the same MetaObject 'Zipcode' and 'State' format. Therefore, no conversion is needed.

List 10: MetaWSDL for Input Parameters of Get Temperature Web Service

```
<?xml version="1.0"?>
<Meta Wsdl xmlns="http://schemas.metaWsdl.org/ws/metaWsdl/">
  <messageMeta name="IngetTemperature">
    <part name="meth1_inType1" unit="xsd: Zipcode">
      <nativeunit name= "Zipcode">
        <conversion mapping="none"/>
      </nativeunit>
    </part>
    <part name="meth1_inType2" unit="xsd: State">
      <nativeunit name= "State">
        <conversion mapping="none"/>
      </nativeunit>
    </part>
    <part name="meth1_inType3" unit="xsd: Day">
      <nativeunit name="Day">
        <conversion mapping="none"/>
      </nativeunit>
    </part>
  </messageMeta>
</meta Wsdl>
```

In order to perform the method signature adaptation for the output result, the inventors constructed the MetaWSDL as shown in List 10 above to include the semantic information, which introduces two MetaObjects in the definitions, i.e. the Celsius and the Fahrenheit basic MetaObjects. The 'unit' specifies that the output from the getTemperature Web Service is in Fahrenheit, and the 'nativeunit' requires it to be in Celsius. Thus, a conversion is required to convert from 'unit' of Fahrenheit to 'nativeunit' of Celsius. Another possible conversion is from Fahrenheit to Kelvin if the application's native unit is Kelvin.

List 11: MetaWSDL for Output Parameters of Get Temperature Web Service

```
<?xml version="1.0"?>
<meta WSDL xmlns="http://schemas.metaWsdl.org/ws/metaWsdl/">
  <message Meta name="Out get Temperature">
    <part name="meth1_outType" unit="xsd: Fahrenheit">
      <nativeunit name="Celsius">
        <conversion mapping="none"/>
      </nativeunit>
      <nativeunit name="Kelvin">
        <conversion mapping="none"/>
      </nativeunit>
    </part>
  </messageMeta>
</meta WSDL>
```

List 12: Input Parameters Obtained by Application Client:
Main Street, Mt. Kisco, N.Y., 10598, U.S.A.
1 week List 13: Application Client Request for Web Service Invocation:
method name: getTemperature
WSDL location: http://invocation4ws1.com/services/getTemperature.wsdl
Input parameters: a vector of Objects including two Strings (Zipcode, State) and one float (Day), i.e. "10598", "NY", 7.0

[See List 10 Above for Definitions]

The output result from the Web Service invocation is 77.0 Fahrenheit. But the application client is using a different unit, for example, Celsius. So the MetaWSDL Processor automatically converts the original result with unit Fahrenheit into the required output with unit Celsius using the MetaObject defined in the MetaObject Library.

List 14: Invocation and Output Adaptation by MetaWSDL Processor

```
// Inside MetaWSDL Processor
{
    // Read in MetaObject library configuration and check for MetaObject
type, i.e. custom or basic
    .....
        // Retrieve and parse WSIL to obtain WSDL and complementary
MetaWSDL
        .....
        // Parse WSDL and MetaWSDL to obtain the following:
        // - method name that matched with the target method name specified by
the client
        // - input parameters
        // Parse input from application client and perform required input
adaptation based on MetaWSDL,
        // e.g. to obtain zipcode "10598" and state "NY"; convert "1 week" to 7
days .....
        // Dynamic invocation of target Web Service using the input parameters
        // constructed based on the MetaWSDL, and obtain output result.
        .....
        // Obtain 'unit' and 'nativeunit' from MetaWSDL output parameter definitions.
        // Compare 'unit' (e.g., Fahrenheit) with 'nativeunit' (e.g., Celsius).
    // If different, perform the conversion below:
        // from 'unit' (e.g., Fahrenheit) to 'nativeunit' (e.g., Celsius) using the
output result in 'value' variable.
        .....
        // Invoke The convert To Standard method from the MetaWSDL Processor
library
        float new Value = MetaWSDL units convert To Standard (unit, nativeunit,
value);
        ......
}
    .....
    // Inside convert To Standard
    // Dynamically Instantiate a MetaObject 'unit' at runtime using the class
name 'Fahrenheit', parsed via
    // MetaWSDL and obtained from MetaObject library configuration Invoke
the method "to Standard" on the MetaObject to convert to from 'unit' to
        'nativeunit'
    // Note. every MetaObject must implement the MetaObject interface,
which has the "to Standard( )" method
        float result = MetaObject to Standard (nativeunit, value);
        return result;
}
    ....
class Fahrenheit {
        public float to Celsius(float Fahrenheit) {
        return (float) (Fahrenheit−32)*5/9;
    {
    public float to Standard (String nativeunit, float value) {
        ....
        // depending on the value in nativeunit, invoke the correct conversion
method if (nativeunit equals ('Celsius')) {
            // from Fahrenheit to Celsius
            return to Celsius (value);
        }
        else{ // process other native unit if applicable
            if (nativeunit equals ("Kelvin"))
                // from Fahrenheit to Kelvin
                return to Kelvin (value);
            }
        }
    }
}
```

List 15: Output from the above code snippet:

```
unit=Fahrenheit, value=77.0
convert to native unit Celsius, value=25.0
or
convert to native unit Kelvin, value=298.15
```

So the final result from Metal WSDL Processor is 77 (Fahrenheit).

As shown in FIGS. 1 and 2, the system for automatic method signature adaptation for dynamic Web service invocation is preferably implemented on a programmed general purpose computer. However, the system can also be implemented on a special purpose computer, a programmed microprocessor or microcontroller and peripheral integrated circuit elements, an ASIC or other integrated circuit, a hardwired electronic or logic circuit such as a discrete element circuit, a programmable logic device or the like. In general, any device on which a finite state machine capable of implementing the method described herein can be used to implement the method for automatic method signature adaptation for dynamic Web service invocation.

While the invention has been described above in relation to a WSIL document it is understood that this is only one exemplary embodiment of the invention. One of ordinary skill in the art understands that the invention is applicable to any other comparable mechanism to retrieve a network accessible document, like MetaWSDL, which describes the semantic information of the WSDL.

It is to also be understood that the MetaObjects described above which form a portion of the invention may be co-located or dispersed. The components of the invention may be stored or processed anywhere within an apparatus, such as a distributed process network, and still form a part of the invention While the invention has been described in terms of several exemplary embodiments, those skilled in the art will recognize that the invention can be practiced with modification within the spirit and scope of the invention.

What is claimed is:

1. A method for adapting an input parameter, the method comprising:
receiving a Web Service invocation request including an input parameter in a first format in accordance with a Web Services Definition Language (WSDL) description of Web Service interface information; and
invoking and exercising a MetaWSDL processor, as executed by a processor on a computer-like device, to automatically adapt the received input parameter to a second format appropriate for invoking target Web Services with correct format and units for said target Web Services, said MetaWSDL processor comprising:
a semantic information representation MetaWSDL (Meta Web Service Development Language), comprising a universal XML (eXtended Markup Language) representation, which includes semantic information additional to the WSDL description, for automatically adapting Web Service invocation request input parameters into another format or unit for target Web Services; and
definitions of adaptations for converting Web Service input parameters into formats and/or units sufficient for invoking target Web Services, to achieve the second format.

2. The method of claim 1, wherein said MetaWSDL processor, based on a content of said received Web Service invocation request, selectively retrieves a WSIL (Web Service Inspection Language) document from a web server to determine which of said adaptations are appropriate.

3. The method of claim 1, wherein said MetaWSDL processor, selectively invokes, based on a content of said received Web Service invocation request, a MetaClient library API (Application Programming Interface) for an advanced UDDI (Universal Description, Discovery, and Integration) search engine to look up UDDI registries.

4. The method of claim 3, further comprising using a result of a UDDI search to provide additional information related to said adaptation.

5. The method of claim 1, wherein the MetaWSDL processor adapts the input parameter by referencing a MetaObject library.

6. The method of claim 5, wherein the MetaObject library includes at least one of a simple MetaObject and a complex MetaObject.

7. The method of claim 6, wherein the MetaObject library defines MetaObjects in a configuration file.

8. The method of claim 5, wherein the MetaObject library includes user-defined MetaObjects.

9. An apparatus for method signature adaptation, the apparatus comprising:
a MetaObject library including self-describing objects defined in MetaWSDL, as information additional to;
a MetaClient library including a preferred library of Web services; and
a MetaWSDL processor adapted to process MetaWSDL and as implemented on a processor of a computer-like device, to adapt parameters and to invoke Web services dynamically, wherein said MetaWSDL comprises a universal XML representation which includes semantic information additional to a WSDL (Web Service Definition Language) description, for automatically adapting Web Service invocation request input parameters into another format or unit for target Web Services, such that an input parameter of a Web Service request is automatically adapted as appropriate for invoking target Web Services with correct format and units for said target Web Services.

10. The apparatus of claim 9, wherein said self-describing objects comprise at least one of a basic MetaObject and a complex or pluggable MetaObject.

11. The apparatus of claim 10, wherein said MetaObject represents at least one of a measurement unit, a monetary unit, a zipcode, and a State name.

12. The apparatus of claim 10, wherein said MetaObject library includes specifications for input parameter adaptation and specifications for output result adaptation.

13. The apparatus of claim 10, wherein said complex or pluggable MetaObject comprises an extensible MetaObject which is customizable and pluggable.

14. The apparatus of claim 9, wherein said basic MetaObject handles a simple unit conversion.

15. The apparatus of claim 9, wherein the MetaObject library comprises a MetaObject library configuration file.

16. The apparatus of claim 9, wherein the MetaClient library comprises APIs to invoke an UDDI search engine to retrieve a preferred set of Web services.

17. The apparatus of claim 9, wherein the MetaClient library stores the location of WSDLs and Web service names.

18. A non-transitory, computer readable storage medium storing instructions for adapting an input parameter which when executed by at least one processor, causes the processor to perform:
receiving an invocation request including an input parameter in a first format; and invoking a MetaWSDL processor, as executed by a processor on a computer-like device, to adapt the input parameter to a second format using information additional to a WSDL (Web Service Definition Language) description, for automatically adapting Web Service invocation request input parameters into another format or unit for target Web Services, such that an input parameter of a Web Service request is automatically adapted as appropriate for invoking target Web Services with correct format and units for said target Web Services.

* * * * *